US010676933B2

(12) United States Patent
Van Leuven

(10) Patent No.: US 10,676,933 B2
(45) Date of Patent: Jun. 9, 2020

(54) SNOW BRAKE ANCHORING SYSTEM AND METHOD

(71) Applicant: Jeffrey Van Leuven, Spokane, WA (US)

(72) Inventor: Jeffrey Van Leuven, Spokane, WA (US)

(*) Notice: Subject to any disclaimer, the term of this patent is extended or adjusted under 35 U.S.C. 154(b) by 0 days.

(21) Appl. No.: 16/506,329

(22) Filed: Jul. 9, 2019

(65) Prior Publication Data

US 2019/0330853 A1 Oct. 31, 2019

Related U.S. Application Data

(63) Continuation-in-part of application No. 15/877,578, filed on Jan. 23, 2018, now Pat. No. 10,385,573.

(51) Int. Cl.
| | |
|---|---|
| *E04D 13/00* | (2006.01) |
| *E04D 13/10* | (2006.01) |
| *F16B 2/06* | (2006.01) |
| *E04D 3/16* | (2006.01) |

(52) U.S. Cl.
CPC .............. *E04D 13/10* (2013.01); *F16B 2/06* (2013.01); *E04D 3/16* (2013.01)

(58) Field of Classification Search
None
See application file for complete search history.

(56) References Cited

U.S. PATENT DOCUMENTS

| | | | |
|---|---|---|---|
| 6,256,934 B1 * | 7/2001 | Alley | E04D 13/10 52/24 |
| 6,453,623 B1 | 9/2002 | Nelson | |
| 7,703,256 B2 | 4/2010 | Haddock | |
| 8,528,888 B2 | 9/2013 | Header | |
| 9,085,900 B2 | 7/2015 | Haddock | |
| 9,893,677 B1 * | 2/2018 | Liu | H02S 20/23 |
| 2005/0102958 A1 * | 5/2005 | Anderson | E04D 3/362 52/698 |
| 2005/0257434 A1 | 11/2005 | Hockman | |
| 2005/0284995 A1 | 12/2005 | Hutter, III | |
| 2006/0075691 A1 * | 4/2006 | Verkamp | E04D 13/10 52/24 |
| 2010/0083588 A1 | 4/2010 | Hockman | |
| 2011/0214367 A1 | 9/2011 | Haddock | |

(Continued)

*Primary Examiner* — Basil S Katcheves
(74) *Attorney, Agent, or Firm* — Randall Danskin P.S.

(57) ABSTRACT

A snow brake anchoring system for an inclined roof having a plurality generally T-shaped standing seams that extend upwardly from the inclined roof surface, the snow brake anchoring system having a two-part anchor body defining a width adjustable elongated and generally rectilinear channel. The first half of the body caring an elongated convexly shaped rotation protuberance on an interior surface, and the second half of the body defines an elongated concavely shaped notch on an interior surface, and the rotation protuberance is at least partially carried within the concavely shaped notch allowing the two body halves to move relative to one another to adjust the width dimension of the elongated generally rectilinear channel. Gripping protuberances are carried at a bottom portion of each edge of the channel to frictionally engage with the T-shaped standing seam, and a plurality of fasteners releasably interconnect the body halves to one another.

16 Claims, 8 Drawing Sheets

(56) References Cited

U.S. PATENT DOCUMENTS

| | | | |
|---|---|---|---|
| 2014/0086680 A1* | 3/2014 | Header | E04D 13/10 403/374.3 |
| 2016/0060869 A1* | 3/2016 | Smeja | E04D 13/00 52/701 |
| 2016/0177984 A1* | 6/2016 | Kovacs | F16M 13/022 361/825 |

* cited by examiner

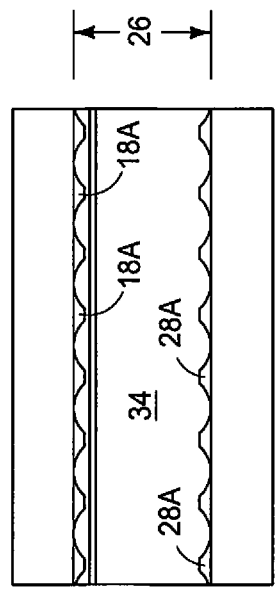
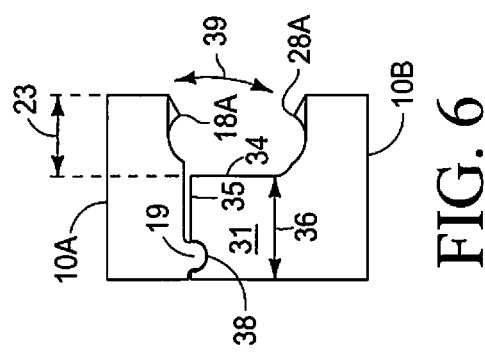
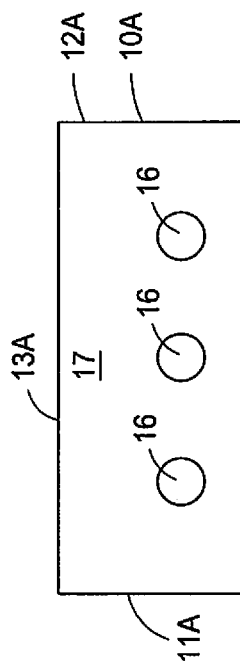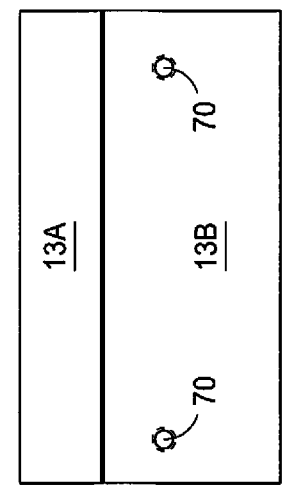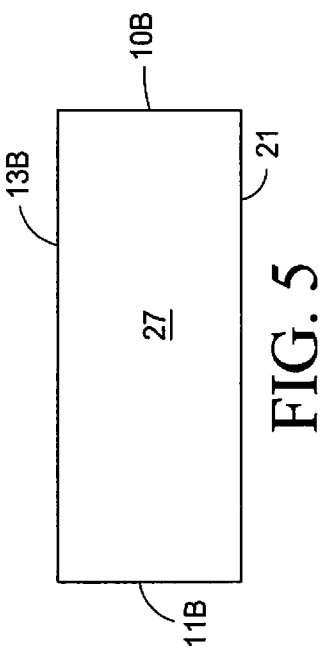

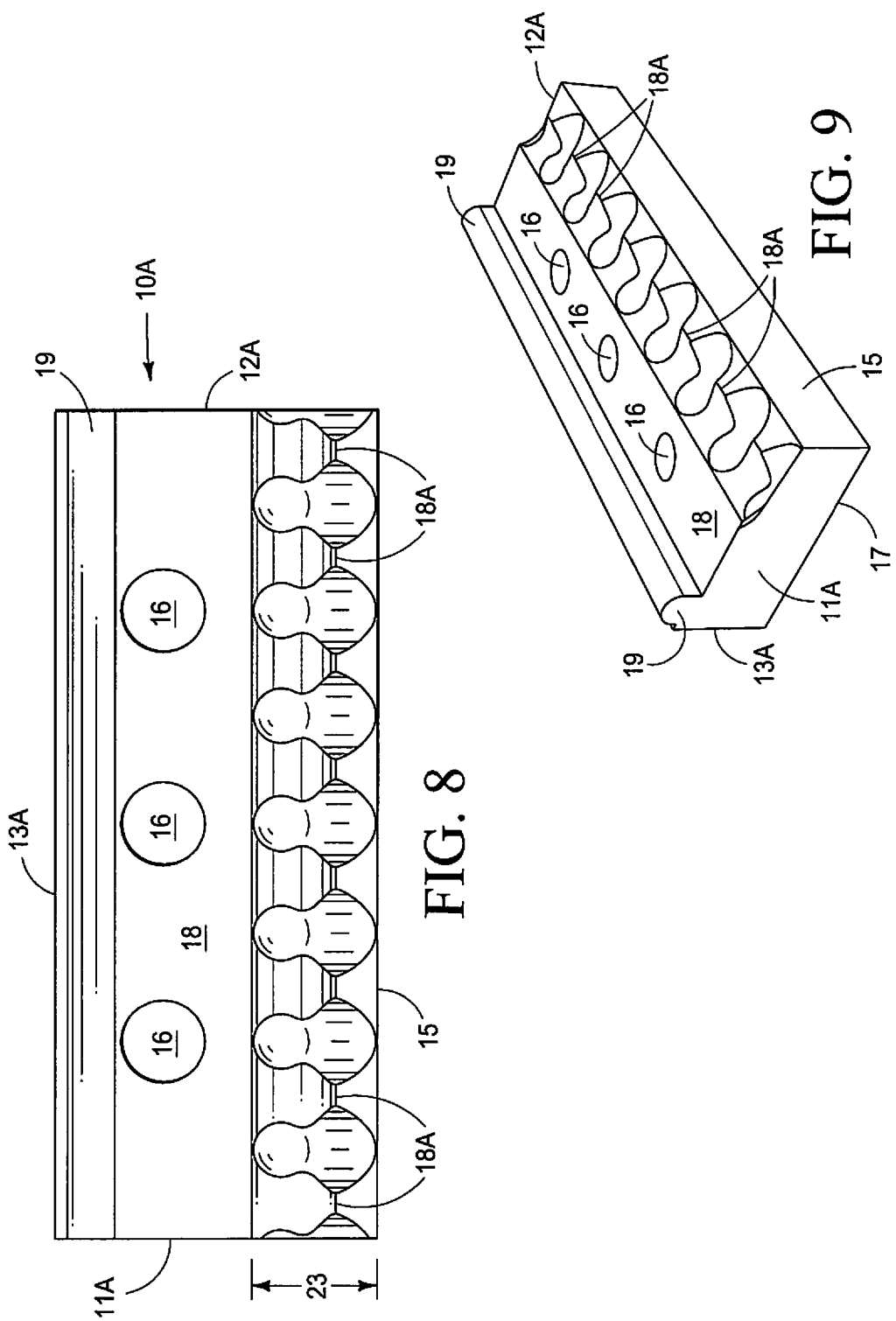

SNOW BRAKE ANCHORING SYSTEM AND METHOD

FIELD OF INVENTION

The present invention relates generally to a snow brakes, and more particularly to a snow brake anchor that attaches to a generally T-shaped standing seam of an inclined roof for use in preventing accumulations of snow from sliding off of the inclined roof and a method therefore.

BACKGROUND

Snow brakes are used to prevent accumulations of snow from sliding off inclined roofs. With the use of a snow brake, accumulated, snow is allowed to melt, or sublimed directly to vapor while retained in place on the inclined roof.

Accumulations of snow that slide off roofs can cause injury to people or damage to property there-below due to the weight of the snow, the speed at which the snow falls, and the unpredictability of when and how much snow will slide off the roof. Snow brake systems are of particular use with metal planar roofs, where minimal frictional resistance and the planar surfaces contribute to the sliding of the snow.

Planar metal roofs are commonly used in industrial applications, such as factories or shops. Due to the type of work commonly associated with factories or shops, people, vehicles, and other equipment is often moving in and out of such buildings. Further, these types of buildings commonly also have irregular heating patterns. For example, a factory may have a heated office, an unheated loading area, and industrial machinery that puts off large amounts of heat. All of these different areas may be contained under a single roof. These irregular heating patterns can lead to irregular melting patterns of snow on the roof. Irregular melting patterns can lead to unpredictable time and places that snow slides off of the roof. Even further, there may be many people unfamiliar with the configuration and possible dangers of the building, such as independent trucking operators. The combination of the unpredictable melting patterns and the people unfamiliar with the melting patterns leads to risks of possible injury to people and equipment.

Similarly, many homes, residences, cabins, ski condos, recreational properties, and resorts in snowy locales also have planar metal roofs, and are subject to similar issues. For example, many homes have wood burning stoves or similar heating apparatus, which lead to irregular heating patterns. Further, many of these types of buildings have attached covered areas that are not walled in, to park equipment or store wood for example. These covered areas may be attached to the same roof system as the home. Again, this leads to an irregular heating pattern between the home and the covered area. In addition, the nature of these types of buildings, in that they may not be occupied regularly, leads to similar risks. Further, children, animals, or even adults who are not aware of the possibility of sliding snow may be in danger of injury. Again, the combination of the unpredictable melting patterns and the people unfamiliar with the melting patterns leads to risks of possible injury to people and equipment.

In locations that receive significant amounts of snow, there is also significant amounts of freezing. Therefore, ice dams or other accumulations of snow and ice may block gutters in these locations and lead to ice ridges on and along portions of the roof. Buildings with planar metal roofs, such as factories, shops, cabins, condos, and ski lodges also typically have very high roofs. Therefore, accessing these gutters to service the gutters and/or to remove ice dams is difficult and potentially dangerous, and the sliding of accumulations of snow may damage the gutters and even tear the gutters from the roof eaves causing substantial damage.

Metal roofs are generally formed of plural large planar or minimally contoured metal panels and often have spaced apart parallel standing seams at adjacent edges of the separate panels. Standing seams are created using the opposing edges of adjacent planar roof panels. A first edge portion of each planar roof panel is bent generally vertically upwardly to form a single thickness upwardly extending lip, and a terminal edge portion of this upwardly extending lip may be "rolled" or otherwise formed to create a dimensionally larger "bulge" or area of increased thickness to enhance engagement with and interconnecting seam portion. (additional configurations are also available). The opposing second edge of the same planar roof panel is similarly bent upwardly, to form a second lip, but this second lip, at the opposing second edge of the roof panel, is formed into a generally T-shaped channel (when viewed in cross section) so that an upper portion of the upwardly bent second lip first bends back toward the first edge of the roof panel and then is rolled, in a curve, back toward the second edge forming a generally planar top portion that has a side to side dimension, and then this second lip is again rolled, in a curve, downwardly and inwardly, and then finally this second lip is bent vertically downwardly so as to extend parallel to, and closely adjacent to the first vertically upwardly extending bend. The result of this sequence of bends is a generally T-shaped (when viewed in cross section) void that can frictionally engage with, and frictionally secure the first edge portion. In this way, each planar roof panel has one half of a cooperating roof seam at each opposing edge portion. The "bulge" of the first edge portion is accommodated within the "void" of the "T-shaped" channel. Such a standing seam configuration (T-shaped) provides material benefits over other types of standing seams, (such as, but not limited to, being substantially self-locking) but this T-shape configuration has also proven to be a difficult configuration for attaching snow brakes, especially when there is a desire to not penetrate, or otherwise form holes in the roof surface which may provide access for water leaks and the like.

As will be understood from the description herein, the first and second edge portions of adjacent planar roof panels overlap so that the generally T-shaped channel of the second edge portion overlaps and interconnects with the first edge portion of an immediately adjacent roof panel. Engagement of the first upwardly extending lip into the second edge T-shaped channel void provides an edge interconnection of the adjacent planar roof panels, and this interconnection may be sealed by known means so as to be water-tight. Further, the cooperating and interconnecting edge portions may be formed during the manufacturing of the roof panels, which eases the installation and interconnection of the planar roof panels. Due to this construction, replacing roof sections when they are damaged or have reached the end of their useful life is simplified. However, like any roof, maintaining the integrity of the roof is critical. Leaks created by any holes in a roof can cause a myriad of problems, from mold to ruined structure and contents. This is a particular concern with metal roofs, since there are typically not several layers of roofing or large overlapping portions of roofing, as there are with asphalt shingle roofs.

The generally T-shaped standing seams, besides making installation and maintenance more convenient, also present an opportunity to install additional apparatus on the roof.

BRIEF SUMMARY OF THE INVENTION

A principal object of the present invention is a snow brake anchoring system for an inclined roof to prevent accumulations of snow from sliding off the inclined roof, the inclined roof having a plurality of generally parallel, spaced apart, generally T-shaped standing seams extending upwardly from the inclined roof surface, and wherein a top portion of each generally T-shaped standing seam has a side-to-side width dimension that is greater than a side-to-side width dimension of a base portion of the generally T-shaped standing seam immediately adjacent the inclined roof surface. The snow brake anchoring system comprises a snow brake anchor that has a two-part body and defines a width adjustable channel. The body has a first half and a second half, and the first half of the two-part body is generally rectilinear in peripheral configuration and has a first end, a second end, a top, a bottom, an exterior facing surface, and an interior facing surface. The first half of the body forms a first leg of the two-part body and a lower portion of the interior facing surface forms one side of the width adjustable channel, and the interior facing surface, spacedly adjacent the top, has an elongated convexly shaped rotation protuberance that extends between the first end and the second end. Plural spacedly arrayed fastener holes communicate between the exterior facing surface, and the interior facing surface, spacedly adjacent below the elongated convexly shaped rotation protuberance. A plurality of spacedly arrayed inwardly protruding gripping protuberances are carried on the interior facing surface adjacent to the bottom.

The second half of the body has a generally rectilinear peripheral configuration, similar to that of the first half of the body, and has a first end, a second end, a top, a bottom, an exterior facing surface and an interior facing surface, and the second half of the two-part body forms a second leg of the two-part body. A lower portion of the inwardly facing surface of the second half of the body forms a second side of the width adjustable channel and a plurality of spacedly arrayed gripping protuberances extend inwardly from the interior facing surface adjacent to the bottom.

A bridge portion is integral with and extends laterally inwardly from the second half of the body adjacent to, and coplanar with, the top and extends between the first end and the second end. The bridge portion has a bottom surface, opposite the top, that forms a transverse wall of the width adjustable channel, and an inwardly facing surface of the bridge portion defines an elongated concave notch that extends between the first end and the second end. The elongated notch is configured to pivotally receive the elongated rotation protuberance of the first half of the body therein. The inwardly facing surface of the bridge portion also defines plural spacedly arrayed threaded fastener holes that axially align with the fastener holes defined in the first half of the body. The first half of the body and the second half of the body are releasably adjustably interconnected with one another with plural fasteners extending through the aligned fastener holes, and the convexly shaped elongated rotation protuberance engages with the elongated concavely shaped notch so that the first half of the body and the second half of the body are movable relative to one another along an axis of rotation that extends between the first end and second end of the two-part body along the elongated concavely shaped notch.

Movement of the first half of the body, relative to the second half of the body, about the convexly shaped rotation protuberance facilitates insertion of a top portion of the generally T-shaped standing seam into the width adjustable channel and the plural fasteners communicating through the first half of the body into the second half of the body cause lateral inward movement of the plurality of gripping protuberances of each body half toward one another to positionally secure the snow brake anchor to the generally T-shaped standing seam of the inclined roof by means of direct physical, and non-penetrating, contact with the generally T-shaped standing seam that is within the width adjustable channel between the opposing gripping protuberances of the first half of the body and the second half of the body while simultaneously accommodating, and not damaging, the top portion of the generally T-shaped standing seam. The top of the second half of the body defines plural spacedly arrayed fastener holes to receive fasteners to releasably secure a snow brake to the snow brake anchor.

A further object of the present invention is a snow brake anchoring system and method and method wherein a diameter of each of the fastener holes defined in the first half of the body is larger than a diameter of the threaded fasteners extending therethrough.

A further object of the present invention is a snow brake anchoring system and method wherein the interior facing surface of the bridge portion is not parallel to the exterior outwardly facing surface of the second half of the body.

A further object of the present invention is a snow brake anchoring system wherein the convexly shaped rotation protuberance is dimensionally larger than the concavely shaped notch so that the first half of the body is movable relative to the second half of the body.

A further object of the present invention is a snow brake anchoring system wherein the width dimension of the width adjustable channel opening adjacent to the bottoms of the first leg and the second leg is smaller than a width dimension of the transverse wall of the bridge portion.

A further object of the present invention is a snow brake anchoring system wherein a second leg is not parallel to the first leg.

A further object of the present invention is a snow brake anchoring system wherein the channel does not have a fixed, or static, width dimension.

A further object of the present invention is a snow brake anchoring system wherein the interior facing surfaces of the first leg and the second leg are not parallel to one another.

A further object of the present invention is a snow brake anchoring system wherein the top of the first half of the body is coplanar with a top of the bridge portion and is coplanar with the top of the second half of the body.

A further object of the present invention is a snow brake anchoring system further comprising snow brake fastener holes defined in the top surface of the bridge portion.

A further object of the present invention is a snow brake anchoring system further comprising fastener voids defined in the bridge portion of the body spacedly adjacent to the top and spacedly adjacent to the first end and spacedly adjacent the second end, and the fastener voids communicate with the snow brake fastener holes.

A further object of the present invention is a snow brake anchoring system wherein the snow brake anchor is composed of a metallic alloy.

A further object of the present invention is a snow brake anchoring system wherein the snow brake anchor is composed of polymer.

A further object of the present invention is a snow brake anchoring system wherein the transverse wall opposite the channel opening is not parallel to the top of the body.

An even still further object of the present invention is a snow brake anchoring system wherein the snow brake is elongate and has a planar portion on an underside surface thereof configured to frictionally communicate with the top of plural spaced apart anchor bodies, and the elongate snow brake has an upper surface that is configured to prevent accumulations of snow on the inclined roof from sliding off the inclined roof.

BRIEF DESCRIPTION OF THE DRAWINGS

FIG. 3 is an orthographic exterior side view of the first half of the snow brake anchor.

FIG. 4 is a plan view of the snow brake anchor.

FIG. 5 is an orthographic exterior side view of the second half of the snow brake anchor.

FIG. 6 is an orthographic end view of the snow brake anchor showing the arc of movement of the first half of the body relative to the second half of the body.

FIG. 7 is an orthographic bottom view of the snow brake anchor showing the plurality of gripping protuberances inside the width adjustable channel.

FIG. 8 is an enlarged orthographic side view of the interior facing surface of the first half of the body showing the elongated convexly shaped rotation protuberance and the plurality of gripping protuberances.

FIG. 9 is a perspective side, end, and bottom view of the first half of the body of FIG. 8.

DETAILED DESCRIPTION OF THE PREFERRED EMBODIMENTS

This disclosure of the invention is submitted in furtherance of the Constitutional purposes of the U.S. Patent Laws "to promote the progress of science and useful arts" (Article I, Section 8).

Figure 1:
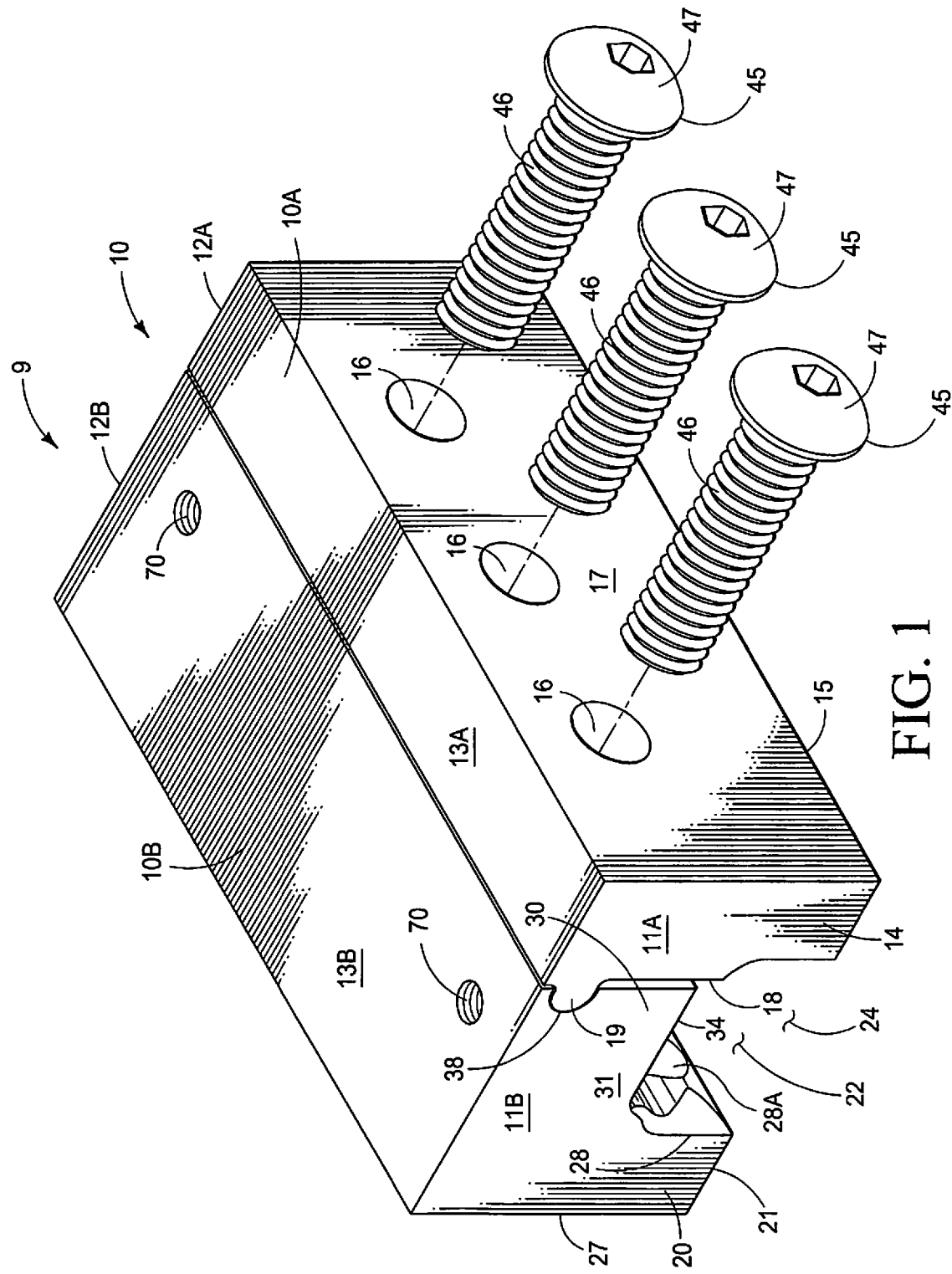
FIG. 1 is a perspective top, side, and end view of the snow brake anchor showing threaded fasteners aligned with the fastener holes.

As shown in FIG. 1, the instant snow brake anchor system provides a generally rectilinear shaped snow brake anchor 9 having a two-part body 10 that has a first half 10A and a second half 10B. Each half 10A, 10B of the body 10 is generally rectilinear in peripheral configuration and each half 10A, 10B of the body 10 has, a first end 11A, 11B, a second end 12A, 12B, and a top 13A, 13B. The first half 10A of the body 10 forms a first leg 14, and the second half 10B of the body 10 forms a second leg 20. The first leg 14 has a bottom 15 and the second leg 20 has a bottom 21. The two-part body 10 further defines a width adjustable channel 22 between an interior inwardly facing surface of the first leg 14 and an interior inwardly facing surface of the second leg 20.

The present invention is a snow brake anchoring system for an inclined roof 100 to prevent accumulations of snow from sliding off the inclined roof 100. The present invention is particularly adapted for an inclined roof 100 that has a plurality of generally parallel, spaced apart, and generally T-shaped standing seams 120 extending upwardly from the inclined roof surface 100, and wherein a top portion 127 of each generally T-shaped standing seam 120 has a side-to-side width dimension 128 that is greater than a side-to-side width dimension of a base portion of the generally T-shaped standing seam 120 adjacent the inclined roof surface 100.

The snow brake anchor 9 defines a width adjustable channel 22 that can fit over and about, and is releasably securable to the T-shaped standing seam. The anchor 9 has a two-part body 10 with a first half 10A and a second half 10B. The first half 10A of the body 10 is generally rectilinear in peripheral configuration and has a first end 11A, a second end 12A, a top 13A, a bottom 15, an exterior outwardly facing surface 17, and an interior inwardly facing surface 18. The first half 10A of the body 10 forms the first leg 14 of the two-part body 10, and a lower portion 15 of the interior inwardly facing surface 18 of the first half 10A of the body 10 forms one interior side of the width adjustable channel 22. An elongated convexly shaped rotation protuberance 19 is carried on the interior inwardly facing surface 18 of the first half 10A of the body 10, spacedly adjacent the top 13A, and the elongated rotation protuberance 19 extends between the first end 11A, and the second end 12A.

The interior inwardly facing surface 18 further defines plural spacedly arrayed fastener holes 16 that communicate between the exterior outwardly facing surface 17 and the interior inwardly facing surface 18 spacedly adjacent below the elongated convexly shaped rotation protuberance 19. In one preferred and contemplated embodiment, a diameter of each of the plural spacedly arrayed fastener holes 16 is larger than a diameter of a threaded fastener 45 that is inserted therein and extends therethrough. The larger diameter of the plural spacedly arrayed fastener holes 16, facilitates movement of the first half 10A of the body 10 relative to the second half 10B of the body 10. In another contemplated embodiment, fastener holes 16 may define threads. (Not shown).

A plurality of spacedly arrayed gripping protuberances 18A are still further carried on the interior inwardly facing surface 18 adjacent to the bottom 15. (FIG. 8).

The second half 10B of the body 10 has a generally rectilinear peripheral configuration, similar to that of the first half 10A of the two-part body 10, and has a first end 11B, a second end 12B, a top 13B, a bottom 21, an exterior outwardly facing surface 27 and an interior inwardly facing surface 28. The second half 10B of the two-part body 10 forms the second leg 20 of the two-part body 10, and a lower portion 21 of the interior inwardly facing surface 28 of the second half 10B of the body 10 forms a second interior side of the width adjustable channel 22. A plurality of spacedly arrayed gripping protuberances 28A are carried on the interior inwardly facing surface 28 adjacent to the bottom 21.

A bridge portion 30 is integral with, and extends laterally inwardly from, the second half 10B of the body 10 adjacent to and coplanar with the top 13B and the bridge portion 30 extends between a first end 31 and a second end 32. The bridge portion 30 has a bottom surface 34 opposite the top 13B that forms a transverse wall 34 of the width adjustable channel 22, and an inwardly facing surface 35 of the bridge portion 30 defines an elongated concave notch 38 that extends between the first end 31 and the second end 32 and is configured to pivotally receive the elongated rotation protuberance 19 of the first half 10A of the body 10 therein. The inwardly facing surface 35 of the bridge portion 30 further defines plural spacedly arrayed threaded fastener holes 37 that axially align with the fastener holes 16 defined in the first half 10A of the body 10, and the first half 10A of the body 10 and the second half 10B of the body 10 are releasably adjustably interconnected with one another with plural fasteners 45 extending through the aligned fastener holes 16, 37, and the convexly shaped elongated rotation protuberance 19 engages with the elongated concavely shaped notch 38 so that the first half 10A of the body 10 and the second half 10B of the body 10 are movable relative to one another along an axis of rotation that extends between the first and second ends 11a, 11B, 12A, 12B of the two-part body 10 along the elongated concavely shaped notch 38. The interior facing surface 35 of the bridge portion 30 may be angular, so as to not be parallel to the exterior facing surface 27 of the second half 10B of the body 10 (such as, but not limited to, angled downwardly and outwardly) to facilitate movement of the body halves 10A, 10B relative to one another and to facilitate a greater width adjustability of the channel 22. A similar effect may be generated by increasing the dimensional size of the elongated rotation protuberance 19, or reducing the dimensional size of the elongated notch 38.

Movement of the first half 10A of the body 10 relative to the second half 10B of the body 10 about the convexly shaped rotation protuberance 19 facilitates insertion of the top portion 127 of the generally T-shaped standing seam 120 into the width adjustable channel 22 and the plural fasteners 45 communicating through the first half 10A of the body 10 into engagement with the second half 10B of the body 10 cause lateral inward movement of the plurality of gripping protuberances 18A, 28A of each body half 10A, 10B toward one another to positionally secure the snow brake anchor 60 to one of the said generally T-shaped standing seams 120 of the inclined roof 100 by means of direct physical, and non-penetrating, contact by the plurality of gripping protuberances 18A, 28A carried by the first half 10A and the second half 10B of the body 10 to compress the standing seam 120 that is within the width adjustable channel 22 between the opposing gripping protuberances 18A, 28A of the first half 10A, of the body 10 and the second half 10B of the body 10 while simultaneously accommodating, and not damaging, the top portion 127 of the generally T-shaped standing seam 120.

The top 13B of the second half 10B of the body 10 defines plural spacedly arrayed fastener holes 70 to receive fasteners 45 to releasably secure a snow brake 60 to the snow brake anchor 9. The fastener holes 70 communicate with fastener voids 71 defined in the bridge portion 30. The fastener voids 71 allow use of self-tapping fasteners (not shown) to connect a snow brake 60 to the anchor body 10.

An elongate snow brake 60 has a first end 61, an opposing second end 62, an underside surface 66 and a top surface 65. The underside surface 66 has a planar portion configured to frictionally communicate with the top surface 13A, 13B of the plural spaced apart anchor bodies 10, and the top surface 65 of the elongate snow brake 60 is configured, such as with, but not limited to, an upwardly extending portion, (See FIG. 12) to prevent accumulations of snow on the inclined roof 100 from sliding off the inclined roof 100. The snow brake 60, may define a plurality of spacedly arrayed fastener holes 67 communicating between the top surface 65 and the underside surface 66 that align with the top portions 13A, 13B of the plural bodies 10. Plural threaded fasteners 45 engage in fastener holes 70 and secure the elongate snow brake 60 to the plural spaced apart bodies 10 that are attached to the T-shaped standing seams 120 of the inclined roof 100. (See FIGS. 12-14).

Figure 14:
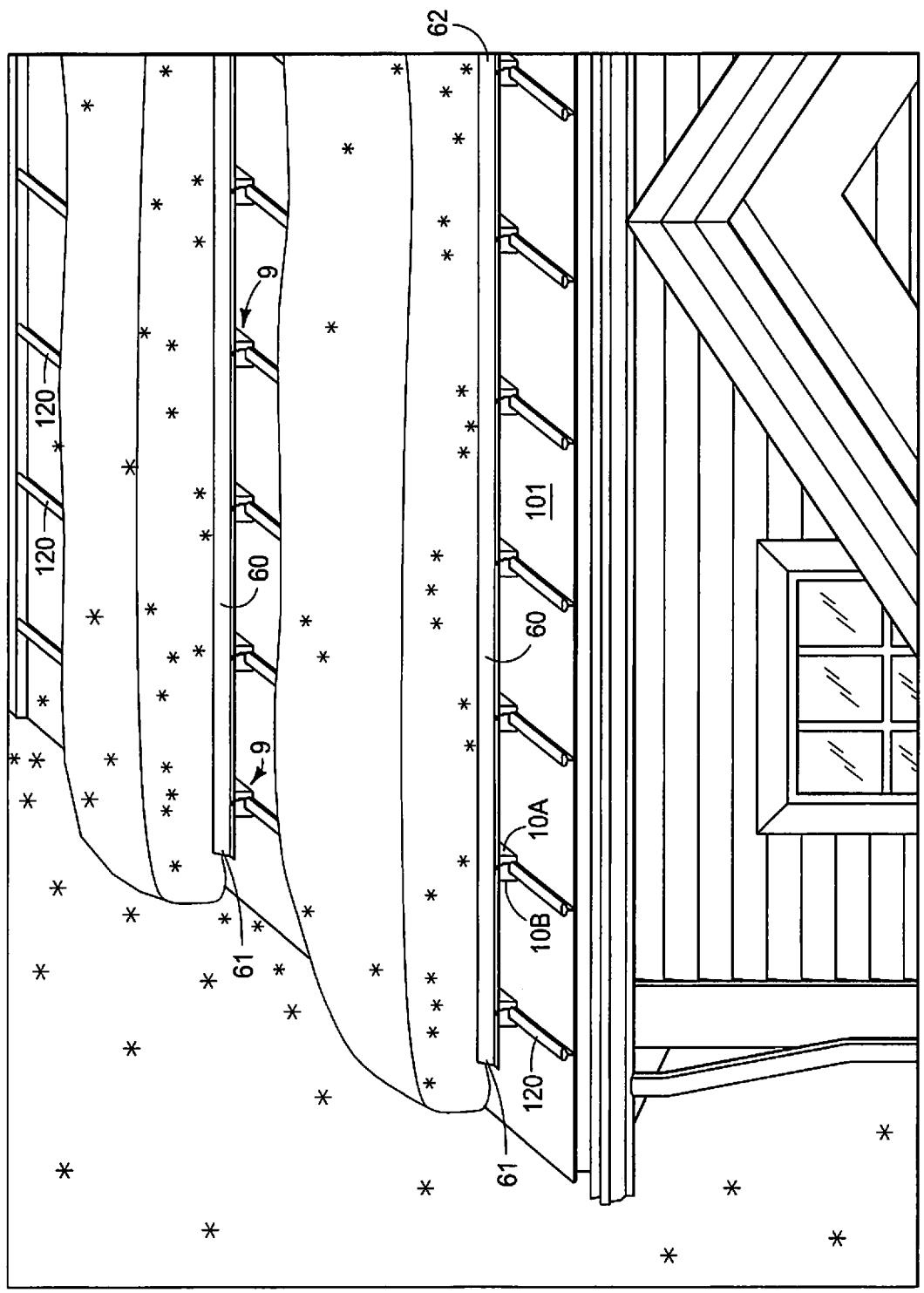
FIG. 14 is a perspective top, side, and end view of the snow brake anchor system, in an assembled and installed configuration, on an inclined roof with generally T-shaped standing seams, and showing an accumulation of snow thereon.

Each half 10A, 10B of the two-part body 10 may be machined from a single piece of bar stock. Alternatively, and without limitation, the body 10 may be assembled from multiple pieces that are interconnected to one another such as by welding, or the halves 10A, 10B of the body 10 may be molded, or cast, or otherwise formed into shape by known processes. The snow brake anchor 9 is of sufficient thickness to maintain rigidity and strength when acted upon by a force of a weight of accumulated snow (FIG. 14). The first leg 14 and the second leg 20 may have a configuration of rectangular cuboids. The first leg 14 has a bottom 15, an outwardly facing surface 17, and an inwardly facing surface 18 that forms part of the width adjustable channel 22. The second leg 20 also has a bottom 21, an outwardly facing surface 27, and an inwardly facing surface 28 that forms a second part of the width adjustable channel 22. Although the bottoms 15, 21 of the legs 14, 20 respectively, are shown in the Figures as rectangular, it is contemplated the bottoms 15, 21, may also be other than rectangular surfaces, such as, but not limited to convex or concave or angular. (not shown).

As shown the Figures, the variable width channel 22 extends between the first end 11 and the second end 12 of the body 10 and is located between the inwardly facing surface of the first leg 14 and the inwardly facing surface of the second leg 20. The channel 22 is elongated and is somewhat rectangular in configuration. The channel 22 has a depth dimension 23 between a channel opening 24 and the transverse wall 34. The channel opening 24 is defined between the bottom 15 of the first leg 14 and the bottom 21 of the second leg 20, and defines a width dimension 26 that is variable. The transverse wall 34 is opposite the channel opening 24. The transverse wall 34 may be rectangular. Alternatively, the transverse wall 34 of the variable width channel 22 may be other than rectangular, such as, but not limited to, arcuate, rounded, concave, convex or angular. (not shown). The elongated nature of the variable with the channel 22 is resistant to torquing forces or other twisting forces that may be applied to the body 10 and attached snow brake 60 by uneven accumulations of snow on the inclined roof surface 101, such as may be caused by drifting and the like.

Optionally, the body 10 may include a friction enhancing and corrosion resistant insert (not shown) disposed within channel 22. The insert may be disposed on any or all of the inwardly facing surface of the first leg 14, the inwardly facing surface of the second leg 20, and/or the transverse wall 34. It is contemplated the insert (not shown) may be composed of a durable, temperature resistant polymer, and may have ridges or other surface configurations to enhance the friction between the body 10 and the standing seam 120, and also to prevent corrosion therebetween. It is contemplated the insert (not shown) may be separable from the body 10, or permanently interconnected with the body 10, or even applied to the body 10, such as a coating applied thereto.

The plurality of spacedly arrayed holes 16, 37 defined in the body halves 10A, 10B are preferably located approximately equidistant from one another, and equidistant from the first ends 11A, 11B and the second ends 12A, 12B.

The body 10 is preferably composed of a metallic alloy. Optionally, this metallic alloy is heat-treated aluminum. Alternatively, the body 10 is composed of a durable, temperature resistant polymer.

The plurality of threaded fasteners 45 releasably secure the snow brake anchor 9 to a T-shaped standing seam 120 of the planar roof 100, by frictionally engaging with and compressing opposing side surfaces of the standing seam 120 that is within width adjustable channel 22 defined by the body 10. The threaded fasteners 45, when tightened, compress the gripping protuberances 18A, 28A of the body haves 10A, 10B into direct frictional contact with the standing seam 120 while accommodating the dimensionally larger top portion 127 of the T-shaped standing seam 120 and without distorting, damaging or bending the dimensionally larger top portion 127. Neither the threaded fasteners 45, nor the gripping protuberances 18A, 28A, when tightened and compressing the standing seam 120 within the channel 22, penetrate any portion of the standing seam 120. Preferably, the threaded fasteners 45 are tightened to a predetermined torque so as to prevent any surface scarring. The generally planar top portion 127 of the T-shaped standing seam may be in direct frictional contact the transverse wall 34.

The plurality of spacedly arrayed holes 16, 37 defined in the body halves 10A, 10B are preferably located vertically below the rotation protuberance 19, vertically below the elongated notch 38, and vertically above the transverse wall 34.

Figure 12:
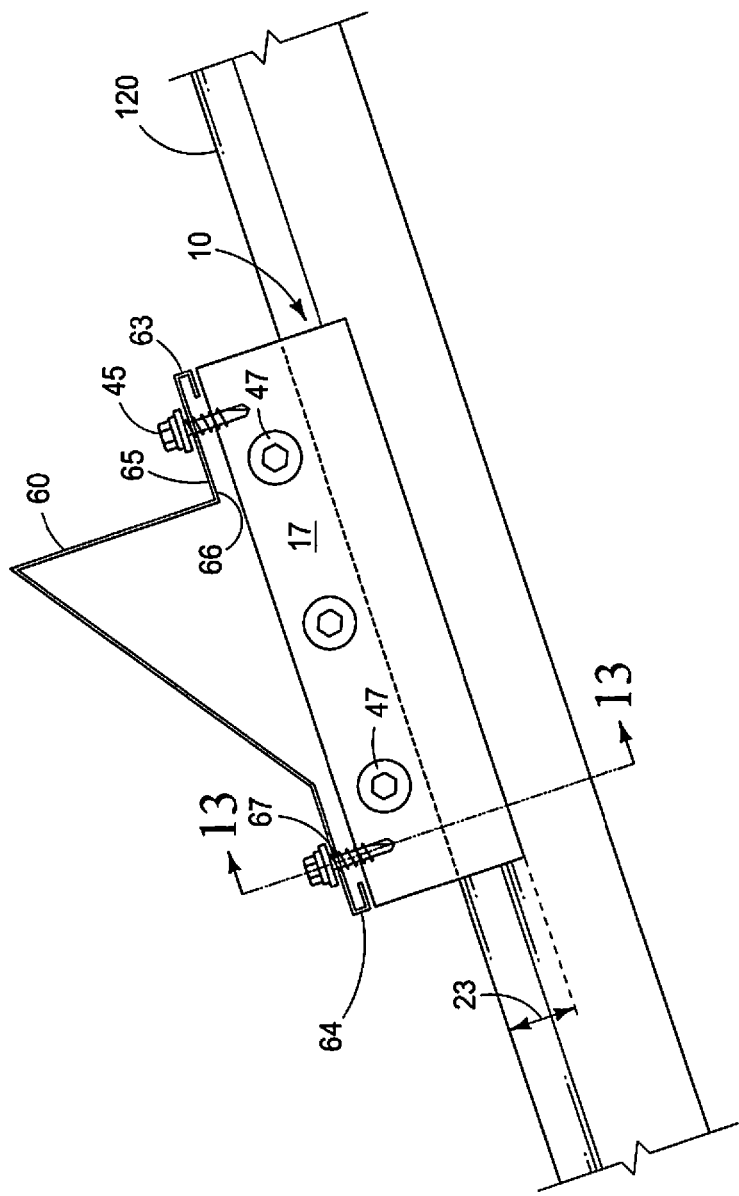
FIG. 12 is an orthographic side view of the anchor body interconnected with a T-shaped standing seam and carrying a snow brake.
Figure 13:
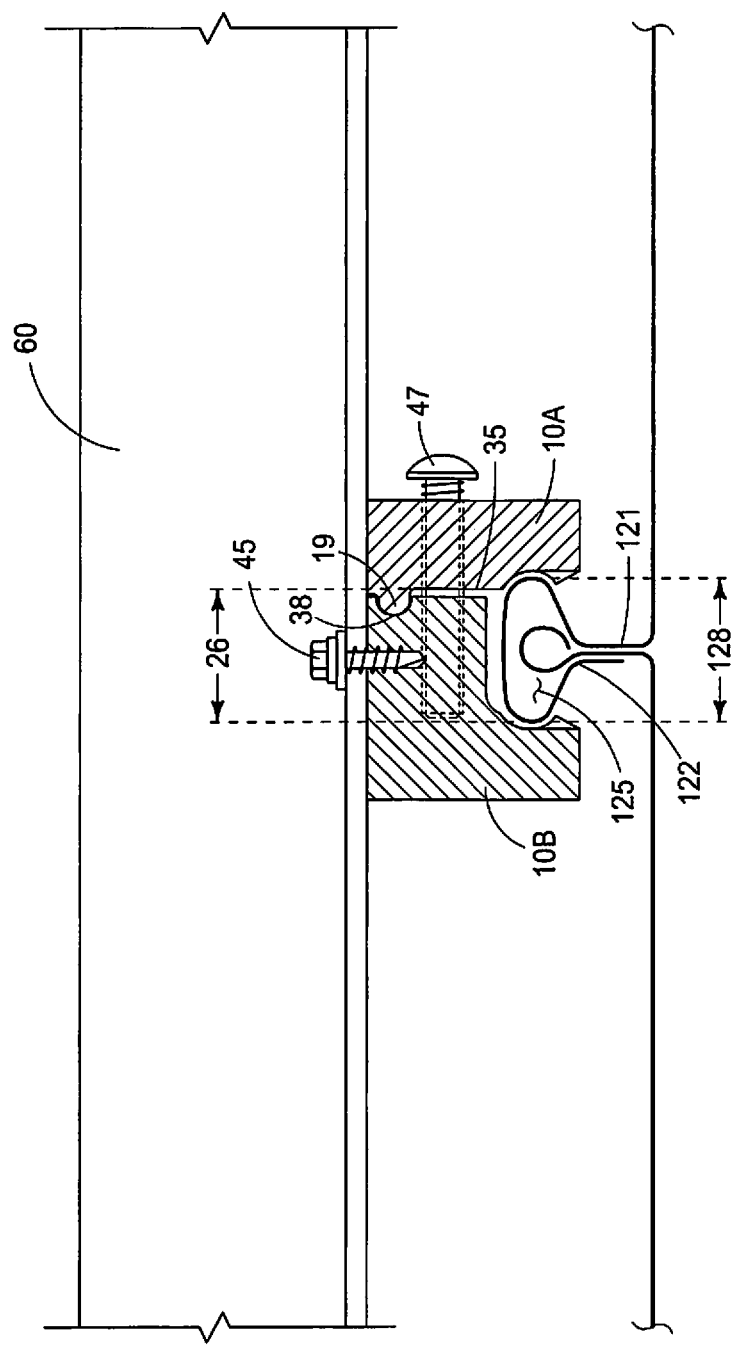
FIG. 13 is an orthographic cross sectional view, taken on line 13-13 of FIG. 12.

As shown in FIGS. 12 and 13, the plurality of threaded through holes 70 are sized and configured to carry threaded fasteners 45 therein to releasably secure a snow brake 60 to the snow brake anchor 9 body 10.

As shown in FIGS. 12 and 14, the snow brake 60 is configured to prevent accumulations of snow on the inclined roof 100 from sliding off the inclined roof 100. The snow brake 60 has a first end 61, a second end 62, a downward edge 64 (FIG. 12), an upward edge 63 (FIG. 12), and may define a plurality of spacedly arrayed through holes 67 communicating between a top 65 and a bottom surface 66. Each of the spacedly arrayed holes 67 defined in the snow brake 60 may be aligned with one of the threaded through holes 70 defined in the top 13B of the body 10 so as to carry a threaded fastener 45 to engage therewith to secure the snow brake 60 to the body 10.

In another contemplated embodiment, the top 13B of the body 10 may not include any predrilled holes 70. Further alternatively, the snow brake 60 may not include any predrilled holes 67. Either of the plurality of threaded through holes 70 or the plurality of spacedly arrayed through holes 67 may be included in the snow brake anchor system, or neither may be included. In the alternative when neither the plurality of threaded through holes 70, nor the plurality of spacedly arrayed through holes 67 are present, the fasteners 45 may be self-tapping fastening devices that are capable of penetrating simultaneously through the snow brake 60 and the top 13B of the body 10.

The position and orientation of the threaded through holes 16 defined in the first half 10A of the body 10 are such that the threaded fasteners 45 are accessible to a user when a snow brake 60 is secured to the snow brake anchor 9. These positions and orientations are such that the threaded fasteners 45 do not interfere with the installation of each other when engaged with the body 10, and the snow brake 60.

The threaded fasteners 45 may be selected from a group comprising various types and sizes of fasteners. The threaded fasteners 45 may have radially enlarged head portions 47. The radially enlarged head portions 47 may be a larger diameter than the plurality of spacedly arrayed holes 16 defined in the body first half 10A. In this manner, the enlarged head portions 47 enable the fasteners 45 to be tightened, such as with a ratchet type tool. The enlarged head portions 47 will not pass through the holes 67 in the snow brake 60 which responsively secures the snow brake 60 to the anchor body 10.

As shown in FIG. 14, a plurality of spacedly arrayed snow brakes 60 may be installed on an inclined roof 100. A single elongate snow brake 60 may be attached to a plurality of spacedly arrayed anchor bodies 10 and the plurality of bodies 10 may be attached to a plurality of spaced apart standing seams 120. Thus, as shown in FIG. 14, multiple snow brakes 60 may hold amounts of snow on an inclined roof 100. In this manner, each snow brake 60 may hold less than the full amount of snow located on an inclined roof 100. By each snow brake 60 holding less than the full amount of snow accumulation on an inclined roof 100, each body 10 is subjected to less force than if the full amount of snow was held by a single snow brake 60.

Operation

Having described the structure of my snow brake anchoring system and method, its use is hereinafter described.

Figure 2:
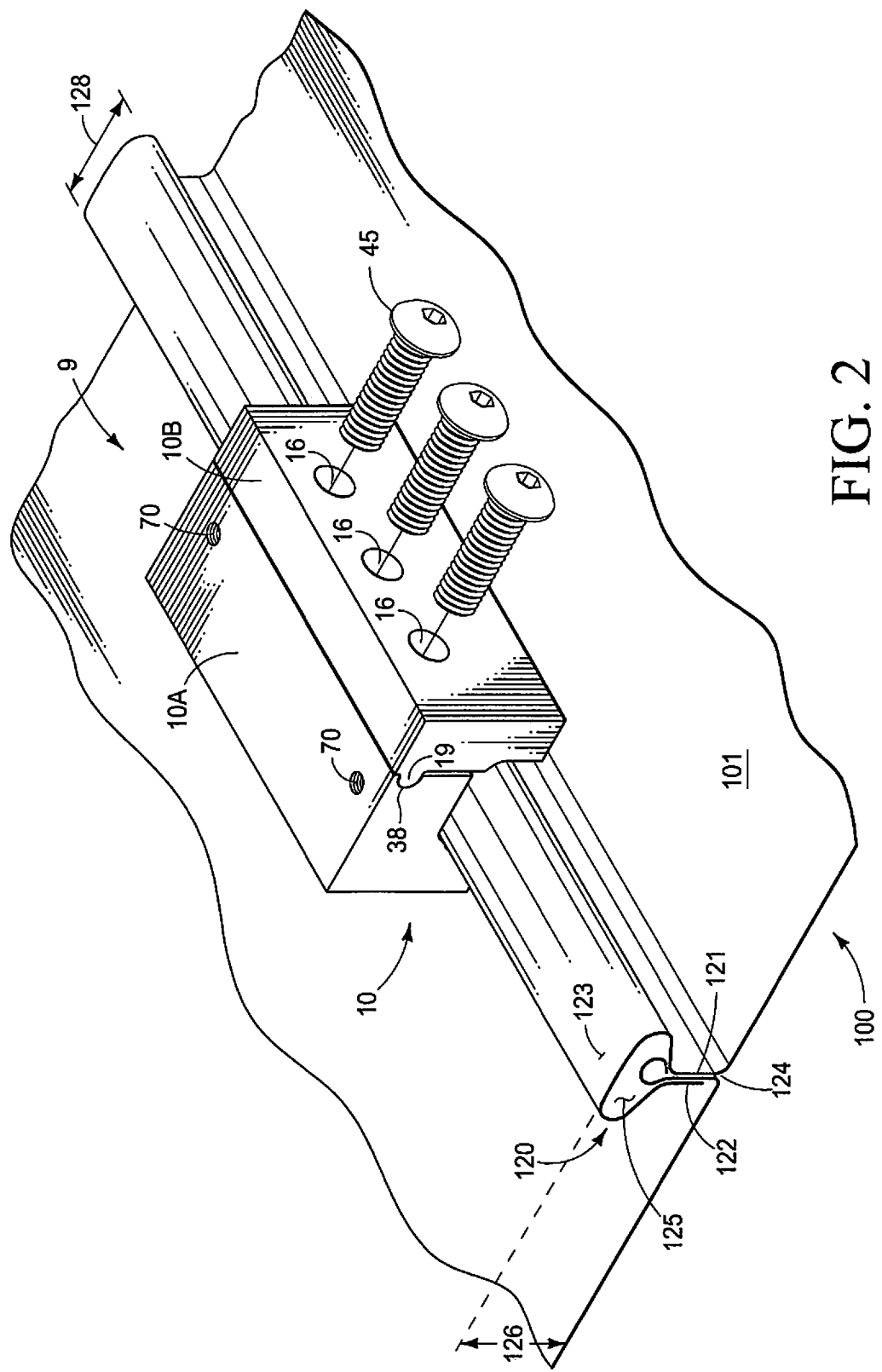
FIG. 2 is a perspective top, side and end view of the snow brake anchor of FIG. 1 interconnected with a generally T-shaped standing seam of an inclined roof.

As shown in FIGS. 2 and 13, the standing seam 120 is formed by two interconnecting portions and has a first part carried on a first edge of a planar roof panel 101 and a second part carried on a second edge of a planar roof panel 101. The first part of the standing seam 120 has a generally planar first side 121, a generally planar second side 122 opposite the first side 121, a generally planar top portion 123, a seam opening 124 located opposite the generally planar top portion 123, and defines an interior space 125. The interior space 125 is disposed between the interior surfaces of the generally planar first side 121, the generally planar second side 122, the generally planar top portion 123, and the seam opening 124. The second part of the standing seam 120 is an upwardly standing lip (not shown) that extends through the seam opening 124 and is positionally maintained within the interior space 125. (See FIG. 13). The upwardly standing lip of the second part may have a configuration other than planar, so as to enhance and maintain engagement with the first part.

A user (not shown) would install the snow brake anchor system on an inclined roof 100. Preferably, the installation would take place when the roof is dry and cleared of debris and snow and ice for safety purposes. The user would calculate the number of anchor bodies 10 and snow brakes 60 needed for the snow brake anchoring system. For example, the user might consult historical snowfall data for the geographic area of the building that the snow brake anchoring system is being installed on. Then the user could determine the anticipated maximal load of snow, and select the appropriate number and configuration of snow brakes 60. The user would then secure the bodies 10 to the standing seams 120 according to the predetermined calculations. The bodies 10 are aligned with each other, so that a snow brake 60 attaches to multiple aligned anchor bodies 10. This alignment may be performed by, for example, snapping a chalk line across the standing seams 120, and then locating the bodies 10 at the point where the perpendicular chalk line cross each of the standing seams 120.

The bodies 10 are secured to the T-shaped standing seams 120 by first placing the second half 10B of a body 10 frictionally against one side 122, 121 of the T-shaped standing seam 120 so that the gripping protuberances 28A are in frictional contact with the side 121, 122 of the T-shaped standing seam 120. Next, the first half 10A of the body 10 is placed against the opposing side 121, 122 of the T-shaped standing seam 120 and positioned so that the holes 16 defined in the first half 10A of the body 10 are aligned with the threaded holes 37 defined in the bridge portion 30 of the second half 10B of the body 10. Next, threaded fasteners 45 are inserted into the holes 16 in the first half 10A of the body 10 and into the threaded hole 37 defined in the second half 10B of the body 10, and then tightening the threaded fasteners 45 with an appropriate tool, such as a wrench or socket or socket drill with an appropriate socket bit to the appropriate torque setting, until the body 10 is secured to the standing seam 120. When the threaded fasteners 45 are tightened, the bodies 10 are secured to the standing seams 120. Optionally, the user would leave the threaded fasteners 45 tightened enough that the bodies 10 do not easily, or freely, move along the standing seam 120, but still loose enough that the bodies 10 can be positionally adjusted along the standing seams 120. In this manner, the bodies 10 can be positionally adjusted up and down the standing seams 120 to enable installation of the snow brake 60. After the snow brake 60 is secured to the bodies 10, as described below, the threaded fasteners 45 can be further tightened to secure the bodies 10 to the standing seams 120. Alternatively, the bodies 10 can be secured to the snow brake 60, as described below, prior to the bodies 10 being secured to the standing seams 120.

The snow brake 60 is secured to the bodies 10 by inserting and tightening the threaded fasteners 45 through the threaded through holes 67 of the snow brake 60 and also through the threaded through holes 70 of the bodies 10. The radially enlarged head portions 47 of the threaded fasteners 45 are turned until the radially enlarged head portions 47 are tightened to the top surface 65 of the snow brake 60. In this manner, the snow brake 60 is installed perpendicular to the standing seams 120.

The installation process, as described above, is repeated for installing a plurality of snow brakes 60.

A first aspect of the present invention is a snow brake anchoring system for an inclined roof 100 to prevent accumulations of snow from sliding off the inclined roof 100, the inclined roof 100 having a plurality of generally parallel, spaced apart, generally T-shaped standing seams 120 extending upwardly from the inclined roof surface 101, and wherein a top portion 127 of each generally T-shaped standing seam 120 has a side-to-side width dimension 128 that is greater than a side-to-side width dimension of a base portion 124 of the generally T-shaped standing seam 120 adjacent the inclined roof surface 101, the snow brake anchoring system comprising: a snow brake anchor 9 that defines a width adjustable channel 22 and has a two-part body 10 with a first half 10A and a second half 10B, and the first half 10A of the two-part body 10 is generally rectilinear in peripheral configuration and has a first end 11A, a second end 12A, a top 13A, a bottom 15, an exterior facing surface 17, and an interior facing 18 surface, and the first half 10A of the body 10 forms a first leg 14 of the two-part body 10 and a lower portion of the interior facing surface 18 forms one side of the width adjustable channel 22, and the interior facing surface 18, spacedly adjacent the top 13A, has an elongated convexly shaped rotation protuberance 19 that extends between the first end 11A and the second end 12A, and the interior facing surface 18 defines plural spacedly arrayed fastener holes 16 that communicate between the exterior facing surface 17 and the interior facing surface 18 spacedly adjacent below the elongated convexly shaped rotation protuberance 19, and a plurality of spacedly arrayed gripping protuberances 18A are defined on the interior facing surface 18 adjacent to the bottom 15, and the second half 10B of the body 10 has a generally rectilinear peripheral configuration similar to that of the first half 10A of the body 10 and has a first end 11B, a second end 12B, a top 13B, a bottom 21, an exterior facing surface 27 and an interior facing surface 28, and the second half 10B of the two-part body 10 forms a second leg 20 of the two-part body 10, and a lower portion of the inwardly facing surface 28 of the second half 10B of the body 10 forms a second side of the width adjustable channel 22 and a plurality of spacedly arrayed gripping protuberances 28A are carried on the interior facing surface 28 adjacent to the bottom 21, and a bridge portion 30 is integral with and extends laterally inwardly from the second half 10B of the body 10 adjacent, to and coplanar with, the top 13B and extends between the first end 11B and the second end 12B, and the bridge portion 30 has a bottom surface 34 opposite the top 13B that forms a transverse wall 34 of the width adjustable channel 22, and an inwardly facing surface 35 of the bridge portion 30 defines an elongated concave notch 38 that extends between the first end 31 and the second end 32 and is configured to pivotally receive the elongated rotation protuberance 19 of the first half 10A of the body 10 therein, and the inwardly facing surface 35 of the bridge portion 30 defines plural spacedly arrayed threaded fastener holes 37 that axially align with the fastener holes 16 defined in the first half 10A of the body 10, and the first half 10A of the body 10 and the second half 10B of the body 10 are releasably adjustably and movably interconnected with one another with plural fasteners 45 extending through the aligned fastener holes 16, 37, and the convexly shaped elongated rotation protuberance 19 at least partially engages with the elongated concavely shaped notch 38 so that the first half 10A of the body 10 and the second half 10B of the body 10 are movable relative to one another along an axis of rotation that extends between the first and second ends 11A, 11B, 12A, 12B of the two-part body 10 along the elongated concavely shaped notch 38; movement of the first half 10A of the body 10 relative to the second half 10B of the body 10 about the convexly shaped rotation protuberance 19 facilitates insertion of the top portion 127 of the generally T-shaped standing seam 120 into the width adjustable channel 22 and the plural fasteners 45 communicating through the first half 10A of the body 10 into the second half 10B of the body 10 cause lateral inward movement of the plurality of gripping protuberances 18A, 28A of each body half 10A, 10B toward one another to positionally secure the snow brake anchor 60 to one of the said generally T-shaped standing seams 120 of the inclined roof 100 by means of direct physical, and non-penetrating, contact by the plurality of gripping protuberances 18A, 28A carried by the first half 10A of the body 10 and the second half 10B of the body 10 to compress the standing seam 120 that is within the width adjustable channel 22 between the opposing gripping protuberances 18A, 28A of the first half 10A of the body 10 and the second half 10B of the body 10 while simultaneously accommodating, and not damaging, the top portion 127 of the generally T-shaped standing seam 120; and the top 13B of the second half 10B of the body 10 defines plural spacedly arrayed fastener holes 70 to receive fasteners 45 to releasably secure a snow brake 60 to the snow brake anchor body 10.

A further aspect of the present invention is a snow brake anchoring system wherein a diameter of each of the fastener holes 16 defined in the first half 10A of the body 10 is larger than a diameter of the threaded fasteners 45 extending therethrough.

A further aspect of the present invention is a snow brake anchoring system wherein the interior facing surface 35 of the bridge portion 30 is not parallel to the outwardly facing surface 27 of the second half 10B of the body 10.

A further aspect of the present invention is a snow brake anchoring system wherein the convexly shaped rotation protuberance 19 is dimensionally larger than the concavely shaped notch 38 so that the first half 10A of the body 10 to pivots relative to the second half 10B of the body 10.

A further aspect of the present invention is a snow brake anchoring system wherein the width dimension 26 of the channel opening 24 adjacent to the bottoms 15, 21 of the first leg 14 and the second leg 20 is smaller than a width dimension of the transverse wall 34 of the bridge portion 30.

A further aspect of the present invention is a snow brake anchoring system wherein a second leg 20 is not parallel to the first leg 14.

A further aspect of the present invention is a snow brake anchoring system wherein the channel 22 has a variable width dimension.

A further aspect of the present invention is a snow brake anchoring system wherein the interior facing surfaces 18, 28 of the first leg 14 and the second leg 20 are not parallel to one another.

A further aspect of the present invention is a snow brake anchoring system wherein the top 13A of the first half 10A of the body 10 is coplanar with a top of the bridge portion 30 and coplanar with the top 13B of the second half 10B of the body 10.

A further aspect of the present invention is a snow brake anchoring system and further comprising snow brake fastener holes 70 defined in the top surface of the bridge portion 30.

A further aspect of the present invention is a snow brake anchoring system and further comprising fastener voids 71 defined in the bridge portion 30 of the second half 10B of the body 10 spacedly adjacent to the top 13B and spacedly adjacent to the first end 11B and spacedly adjacent the second end 12B, and the fastener voids 71 communicate with the snow brake fastener holes 70.

A further aspect of the present invention is a snow brake anchoring system wherein the snow brake anchor 9 is composed of a metallic alloy.

A further aspect of the present invention is a snow brake anchoring system wherein the snow brake anchor 9 is composed of polymer.

A further aspect of the present invention is a snow brake anchoring system wherein the transverse wall 34 opposite the channel opening 24 is arcuate in shape.

A still further aspect of the present invention is a snow brake anchoring system for an inclined roof 100 to prevent accumulations of snow from sliding off the inclined roof 100, the inclined roof 100 having a plurality of generally parallel, spaced apart, generally T-shaped standing seams 120 extending upwardly from the inclined roof surface 101, and wherein a top portion 127 of each generally T-shaped standing seam 120 has a side-to-side width dimension 128 that is greater than a side-to-side width dimension of a base portion 124 of the generally T-shaped standing seam 120 adjacent the inclined roof surface 101, the snow brake anchoring system comprising a snow brake anchor 9 that defines a width adjustable channel 22, and has a two-part body 10 with a first half 10A and a second half 10B, and the first half 10A of the body 10 is generally rectilinear in peripheral configuration and has a first end 11A, a second end 12A, a top 13A, a bottom 15, an exterior facing surface 17, and an interior facing surface 18, and the first half 10A of the body 10 forms a first leg 14 of the two-part body 10, and a lower portion of the interior facing surface 18 of the first half 10A of the body 10 forms one side of the width adjustable channel 22, and the interior facing surface 18 of the first half 10A of the body 10, spacedly adjacent the top 13A, has an elongated convexly shaped rotation protuberance 19 that extends between the first end 11A and the second end 12A, and the interior facing surface 18 defines plural spacedly arrayed fastener holes 16 that communicate between the exterior facing surface 17 and the interior facing surface 18 spacedly adjacent below the elongated convexly shaped rotation protuberance 19, and a plurality of spacedly arrayed gripping protuberances 18A are carried on the interior facing surface 18 adjacent to the bottom 15, and the second half 10B of the body 10 has a generally rectilinear peripheral configuration similar to that of the first half 10A of the two party body 10 and has a first end 11B, a second end 12B, a top 13B, a bottom 21, an exterior facing surface 27 and an interior facing surface 28, and the second half 10B of the two-part body 10 forms a second leg 20 of the two-part body 10, and a lower portion of the inwardly facing surface 28 of the second half 10B of the body 10 forms a second side of the width adjustable channel 22 and a plurality of spacedly arrayed gripping protuberances 28A are carried on the interior facing surface 28 adjacent to the bottom 21, and a bridge portion 30 is integral with and extends laterally inwardly from the second half 10B of the body 10 adjacent to and coplanar with the top 13B and extends between the first end 31 and the second end 32, and the bridge portion 30 has a bottom surface 34 opposite the top 13B that forms a transverse wall 34 of the width adjustable channel 22, and an inwardly facing surface 35 of the bridge portion 30 defines an elongated concave notch 38 that extends between the first end 31 and the second end 32 and is configured to pivotally, and at least partially, receive the elongated rotation protuberance 19 of the first half 10A of the body 10 therein, and the inwardly facing surface 35 of the bridge portion 30 defines plural spacedly arrayed threaded fastener holes 37 that axially align with the fastener holes 16 defined in the first half 10A of the body 10, and the first half 10A of the body 10 and the second half 10B of the body 10 are releasably adjustably, and movably, interconnected with one another with plural fasteners 45 extending through the aligned fastener holes 16, 37, and the convexly shaped elongated rotation protuberance 19 engages, at least partially within, the elongated concavely shaped notch 38 so that the first half 10A of the body 10 and the second half 10B of the body 10 are movable relative to one another along an axis of rotation that extends between the first and second ends 11A, 116, 12A, 12B of the two-part body 10 along the elongated concavely shaped notch 38; and movement of the first half 10A of the body 10 relative to the second half 10B of the body 10 about the convexly shaped rotation protuberance 19 facilitates insertion of the top portion 127 of the generally T-shaped standing seam 120 into the width adjustable channel 22 and the plural fasteners 45 communicating through the first half 10A of the body 10 into the second half 10B of the body 10 cause lateral inward movement of the plurality of gripping protuberances 18A, 28A of each body half 10A, 10B toward one another to positionally secure the snow brake anchor 9 to one of the said generally T-shaped standing seams 120 of the inclined roof 100 by means of direct physical, and non-penetrating, contact by the plurality of gripping protuberances 18A, 28A carried by the first half 10A of the body 10 and the second half 10B of the body 10 to compress the standing seam 120 that is within the width adjustable channel 22 between the opposing gripping protuberances 18A, 28A of the first half 10A of the body 10 and the second half 10B of the body 10 while simultaneously accommodating, and not damaging, the side to side dimension 128 of the top portion 127 of the generally T-shaped standing seam 120; and the top 13B of the second half 10B of the body 10, and a bridge portion 30, defines plural spacedly arrayed fastener holes 70 to receive fasteners 45 to releasably secure a snow brake 60 to the snow brake anchor 9; an elongate snow brake 60 having a first end 61, an opposing second end 62, an underside surface 66 and a top surface 65, the underside surface 66 having a planar portion configured to frictionally communicate with the top surface 13B of the anchor body 10, and the upper surface 65 of the elongate snow brake 60 is configured to prevent accumulations of snow on the inclined roof 100 from sliding off the inclined roof 100, the snow brake defining a plurality of spacedly arrayed through holes 67 communicating between the upper surface 65 and the underside surface 66 that align with the fastener holes 70 defined in the anchor body 10; and plural threaded fasteners 45 secure the elongate snow brake 60 to the plural spaced apart bodies 10 anchored to the inclined roof 100.

In compliance with the statute, the invention has been described in language more or less specific as to structural and methodical features. It is to be understood, however, that the invention is not limited to the specific features shown and described since the means herein disclosed comprise preferred forms of putting the invention in to effect. The invention is, therefore, claimed in any of its forms or modifications within the proper scope of the appended claims appropriately interpreted in accordance with the Doctrine of Equivalents.

I claim:

1. A snow brake anchoring system for an inclined roof to prevent accumulations of snow from sliding off the inclined roof, the inclined roof having a plurality of generally parallel, spaced apart, generally T-shaped standing seams extending upwardly from the inclined roof surface, and wherein a top portion of each generally T-shaped standing seam has a side-to-side width dimension that is greater than a side-to-side width dimension of a base portion of the generally T-shaped standing seam adjacent the inclined roof surface, the snow brake anchoring system comprising:
    a snow brake anchor that defines a width adjustable channel and has a two-part body with a first half and a second half, and
        the first half of the two-part body is generally rectilinear in peripheral configuration and has a first end, a second end, a top, a bottom, an exterior facing surface, and an interior facing surface, and the first half of the body forms a first leg of the two-part body and a lower portion of the interior facing surface forms one side of the width adjustable channel, and the interior facing surface, spacedly adjacent the top, has an elongated convexly shaped rotation protuberance that extends between the first end and the second end, and the interior facing surface defines plural spacedly arrayed fastener holes that communicate between the exterior facing surface and the interior facing surface spacedly adjacent below the elongated convexly shaped rotation protuberance, and a plurality of spacedly arrayed gripping protuberances are defined on the interior facing surface adjacent to the bottom, and
    the second half of the body has a generally rectilinear peripheral configuration similar to that of the first half of the body and has a first end, a second end, a top, a bottom, an exterior facing surface and an interior facing surface, and the second half of the two-part body forms a second leg of the two-part body, and a lower portion of the inwardly facing surface of the second half of the body forms a second side of the width adjustable channel and a plurality of spacedly arrayed gripping protuberances are defined on the interior facing surface adjacent to the bottom, and
    a bridge portion is integral with and extends laterally inwardly from the second half of the body adjacent, to and coplanar with, the top and extends between the first end and the second and, and the bridge portion has a bottom surface opposite the top that forms a transverse wall of the width adjustable channel, and an inwardly facing surface of the bridge portion defines an elongated concave notch that extends between the first end and the second end and is configured to pivotally receive the elongated rotation protuberance of the first half of the body therein, and the inwardly facing surface of the bridge portion defines plural spacedly arrayed threaded fastener holes that axially align with the fastener holes defined in the first half of the body, and
    the first half of the body and the second half of the body are releasably adjustably interconnected with one another with plural fasteners extending through the aligned fastener holes, and the convexly shaped elongated rotation protuberance engages with the elongated concavely shaped notch so that the first half of the body and the second half of the body are movable relative to one another along an axis of rotation that extends between the first and second ends of the two-part body along the elongated concavely shaped notch;
    movement of the first half of the body relative to the second half of the body about the convexly shaped rotation protuberance facilitates insertion of the top portion of the generally T-shaped standing seam into the width adjustable channel and the plural fasteners communicating through the first half of the body into the second half of the body cause lateral inward movement of the plurality of gripping protuberances of each body half toward one another to positionally secure the snow brake anchor to one of the said generally T-shaped standing seams of the inclined roof by means of direct physical, and non-penetrating, contact by the plurality of gripping protuberances carried by the first half of the body and the second half of the body to compress the standing seam that is within the width adjustable channel between the opposing gripping protuberances of the first half of the body and the second half of the body while simultaneously accommodating, and not damaging, the top portion of the generally T-shaped standing seam; and
    the top of the second half of the body defines plural spacedly arrayed fastener holes to receive fasteners to releasably secure a snow brake to the snow brake anchor.

2. A snow brake anchoring system of claim 1 and wherein a diameter of each of the fastener holes defined in the first half of the body is larger than a diameter of the threaded fasteners extending therethrough.

3. A snow brake anchoring system of claim 1 and wherein the interior facing surface of the bridge portion is not parallel to the outwardly facing surface of the second half of the body.

4. A snow brake anchoring system of claim 1 and wherein the convexly shaped rotation protuberance is dimensionally larger than the concavely shaped notch so that the first half of the body to pivots relative to the second half of the body.

5. A snow brake anchoring system of claim 1 and wherein the width dimension of the channel opening adjacent to the bottoms of the first leg and the second leg is smaller than a width dimension of the transverse wall of the bridge portion.

6. A snow brake anchoring system of claim 1 and wherein second leg is not parallel to the first leg.

7. A snow brake anchoring system of claim 1 and wherein the channel has a variable width dimension.

8. A snow brake anchoring system of claim 1 and wherein the interior facing surfaces of the first leg and the second leg are not parallel to one another.

9. A snow brake anchoring system of claim 1 and wherein the top of the first half of the body is coplanar with a top of the bridge portion and coplanar with the top of the second half of the body.

10. A snow brake anchoring system of claim 1 and further comprising snow brake fastener holes defined in the top surface of the bridge portion.

11. A snow brake anchoring system of claim 1 and further comprising fastener voids defined in the bridge portion of the body spacedly adjacent to the top and spacedly adjacent to the first end and spacedly adjacent the second end, and the fastener voids communicate with the snow brake fastener holes.

12. The snow brake anchoring system of claim 1 wherein the snow brake anchor is composed of a metallic alloy.

13. The snow brake anchoring system of claim 1 wherein the snow brake anchor is composed of polymer.

14. The snow brake anchoring system of claim 1 wherein the transverse wall opposite the channel opening is arcuate in shape.

15. The snow brake anchoring system of claim 1 and further comprising:
a snow break that is elongate and has a planar portion on an underside surface thereof configured to frictionally communicate with the top surface of the plural spaced apart anchor bodies, and the elongate snow brake has an upper surface that is configured to prevent accumulations of snow on the inclined roof from sliding off the inclined roof, the snow brake defining a plurality of spacedly arrayed through holes communicating between the upper surface and the underside surface that align with the fastener holes defined in the anchor bodies to carry the fasteners to secure the elongate snow brake to the plural spaced apart anchor bodies attached to the inclined roof.

16. A snow brake anchoring system for an inclined roof to prevent accumulations of snow from sliding off the inclined roof, the inclined roof having a plurality of generally parallel, spaced apart, generally T-shaped standing seams extending upwardly from the inclined roof surface, and wherein a top portion of each generally T-shaped standing seam has a side-to-side width dimension that is greater than a side-to-side width dimension of a base portion of the generally T-shaped standing seam adjacent the inclined roof surface, the snow brake anchoring system comprising:

a snow brake anchor that defines a width adjustable channel, and has a two-part body with a first half and a second half, and
the first half of the body is generally rectilinear in peripheral configuration and has a first end, a second end, a top, a bottom, an exterior facing surface, and an interior facing surface, and the first half of the body forms a first leg of the two-part body, and a lower portion of the interior facing surface of the first half of the body forms one side of the width adjustable channel, and the interior facing surface of the first half of the body, spacedly adjacent the top, has an elongated convexly shaped rotation protuberance that extends between the first end and the second end, and the interior facing surface defines plural spacedly arrayed fastener holes that communicate between the exterior facing surface and the interior facing surface spacedly adjacent below the elongated convexly shaped rotation protuberance, and a plurality of spacedly arrayed gripping protuberances are defined on the interior facing surface adjacent to the bottom, and
the second half of the body has a generally rectilinear peripheral configuration similar to that of the first half of the two party body and has a first end, a second end, a top, a bottom, an exterior facing surface and an interior facing surface, and the second half of the two-part body forms a second leg of the two-part body, and a lower portion of the inwardly facing surface of the second half of the body forms a second side of the width adjustable channel and a plurality of spacedly arrayed gripping protuberances are defined on the interior facing surface adjacent to the bottom, and
a bridge portion is integral with and extends laterally inwardly from the second half of the body adjacent to and coplanar with the top and extends between the first end and the second and, and the bridge portion has a bottom surface opposite the top that forms a transverse wall of the width adjustable channel, and an inwardly facing surface of the bridge portion defines an elongated concave notch that extends between the first end and the second end and is configured to pivotally receive the elongated rotation protuberance of the first half of the body therein, and the inwardly facing surface of the bridge portion defines plural spacedly arrayed threaded fastener holes that axially align with the fastener holes defined in the first half of the body, and
the first half of the body and the second half of the body are releasably adjustably interconnected with one another with plural fasteners extending through the aligned fastener holes, and the convexly shaped elongated rotation protuberance engages with the elongated concavely shaped notch so that the first half of the body and the second half of the body are movable relative to one another along an axis of rotation that extends between the first and second ends of the two-part body along the elongated concavely shaped notch; and
movement of the first half of the body relative to the second half of the body about the convexly shaped rotation protuberance facilitates insertion of the top portion of the generally T-shaped standing seam into the width adjustable channel and the plural fasteners communicating through the first half of the body into the second half of the body cause lateral inward movement of the plurality of gripping protuberances of each body half toward one another to positionally secure the snow brake anchor to one of the said generally T-shaped standing seams of the inclined roof by means of direct physical, and non-penetrating, contact by the plurality of gripping protuberances carried by the first half of the body and the second half of the body to compress the standing seam that is within the width adjustable channel between the opposing gripping protuberances of the first half of the body and the second half of the body while simultaneously accommodating, and not damaging, the side to side dimension of the top portion of the generally T-shaped standing seam; and the top of the second half of the body defines plural spacedly arrayed fastener holes to receive fasteners to releasably secure a snow brake to the snow brake anchor;

an elongate snow brake having a first end, an opposing second end, an underside surface and a upper surface, the underside surface having a planar portion configured to frictionally communicate with the top surface of the plural spaced apart anchor bodies, and the upper surface of the elongate snow brake is configured to prevent accumulations of snow on the inclined roof from sliding off the inclined roof, the snow brake defining a plurality of spacedly arrayed through holes communicating between the upper surface and the underside surface that align with the fastener holes defined in the plural anchor bodies; and plural threaded fasteners to secure the elongate snow brake to the plural spaced apart bodies anchored to the inclined roof.

\* \* \* \* \*

UNITED STATES PATENT AND TRADEMARK OFFICE
CERTIFICATE OF CORRECTION

PATENT NO. : 10,676,933 B2
APPLICATION NO. : 16/506329
DATED : June 9, 2020
INVENTOR(S) : Jeffrey Van Leuven It is certified that error appears in the above-identified patent and that said Letters Patent is hereby corrected as shown below:

On the Title Page

In the Abstract, Line 6: Delete the word "caring" and insert the word --carrying--.

In the Specification

Column 4: Line 19: Delete the second group of words "and method".

Column 4: Line 56: Insert the word --to-- between the words --adjacent-- and --second--.

Figures 10, 11:
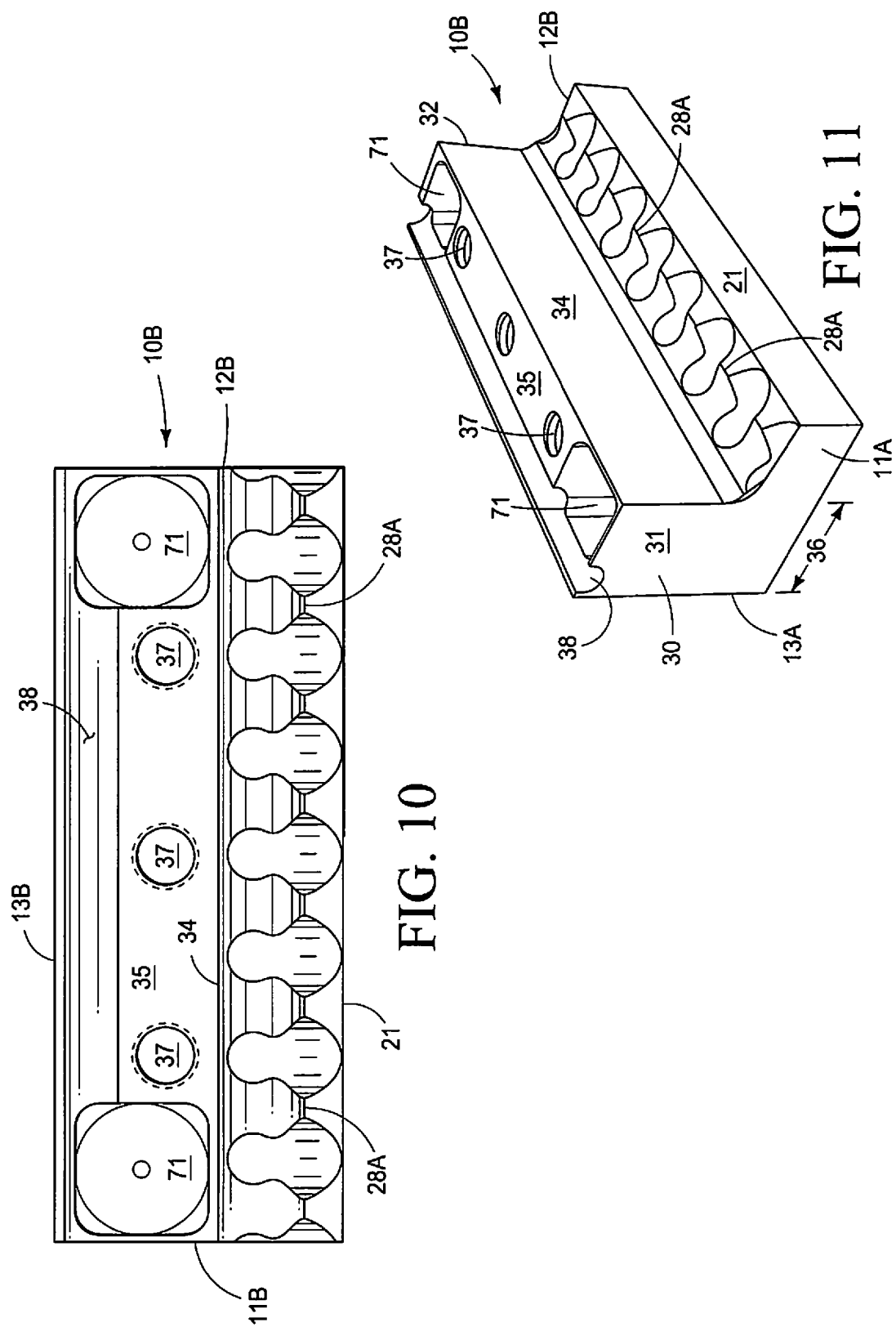
FIG. 10 is an enlarged orthographic side view of the interior facing surface of the second half of the body showing the elongated concavely shaped notch, the fastener voids, the threaded fastener holes, and the plurality of gripping protuberances.
FIG. 11 is a perspective side, end, and bottom view of the second half of the body of FIG. 10 a showing the bridge portion, the transverse wall and fastener voids.

Column 5: Line 41: Delete the word "a" after FIG. 10.

Column 7: Line 22: Capitalize A after the number 11.

Column 8: Line 33: Insert the word --in-- between the words --shown-- and --the figures--.

Column 9: Line 28: Insert the word --with-- between the words --contact-- and --the--.

Column 11: Line 63: Move the number --18-- to after the word --surface--.

Column 13: Line 16: Delete the word "to".

Column 14: Line 25: Delete the words "two party" insert the words --two-part--.

Column 14: Line 58: Delete the numbers "11 6" and insert the number --11B--.

Column 15: Line 36: Delete the word "in to" and insert the word --into--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,676,933 B2

In the Claims

Column 16: Line 20: Delete the word "and" and insert the word --end--.

Column 17: Line 11: Delete the word "to".

Column 17: Line 45: Delete the word "break" and insert the word --brake--.

Column 19: Line 18: Delete the word "a" and insert the word --an--.